Jan. 4, 1966  J. S. HALBERN  3,227,473
CHECK IDENTIFICATION
Filed Dec. 12, 1963  3 Sheets-Sheet 1

INVENTOR.
JULIAN S. HALBERN
BY Lyon & Lyon
ATTORNEYS

Jan. 4, 1966  J. S. HALBERN  3,227,473
CHECK IDENTIFICATION
Filed Dec. 12, 1963  3 Sheets-Sheet 2

FIG. 3A.

TEAR OFF AT THIS LINE <u>AFTER</u> ALL INSTRUCTIONS HAVE BEEN FOLLOWED — TEAR OFF

NOTICE TO PERSONS CASHING THIS CHECK:
1. <u>BEFORE</u> CASHING THIS CHECK—HAVE DRAWER WRITE INFORMATION REQUIRED IN SPACES INDICATED AT BOTTOM OF THIS CHECK— IN YOUR PRESENCE.
2. <u>AFTER</u> DRAWER HAS WRITTEN INFORMATION REQUIRED— TEAR OFF ALONG PERFORATED LINE ABOVE (INDICATED BY ARROWS ←)
3. PAY ONLY IF INFORMATION CORRESPONDS TO THAT CONCEALED UNDER THIS TAB

NATIONAL TRAVELERS CHECK
DATE _____
PAY TO THE ORDER OF _____  ($10.00)
— TEN DOLLARS —
DRAWER— PLEASE WRITE INFORMATION REQUIRED IN SPACES INDICATED BELOW
SIGNATURE: _____   IDENTIFYING SYMBOL: _____
                      WIFE'S NAME: _____

FIG. 4A.

PAYEE'S NAME: SAM HOPKINS
X | WIFE'S NAME: MARTHA
   | FATHER'S NAME:
   | MOTHER'S NAME:

NOTICE TO PERSON WRITING A CHECK:

AFTER INSERTING FLAP BEHIND CHECK (NEXT PAGE)
WRITE OR PRINT NAME OF PAYEE AND PROVIDE IDENTIFYING
SYMBOL(S) IN SPACES INDICATED ABOVE BY CROSS.
PLEASE PLACE A CROSS ON THE CHECK (NEXT PAGE) IN FRONT OF
THE IDENTIFYING SYMBOL(S) TO CORRESPOND WITH THAT
ON THIS PAGE.

REMOVE OR KEEP THIS FOR YOUR RECORD
OF THIS TRANSACTION.

INVENTOR.
JULIAN S. HALBERN
BY *Lyon & Lyon*
ATTORNEYS

Figures 4, 5:
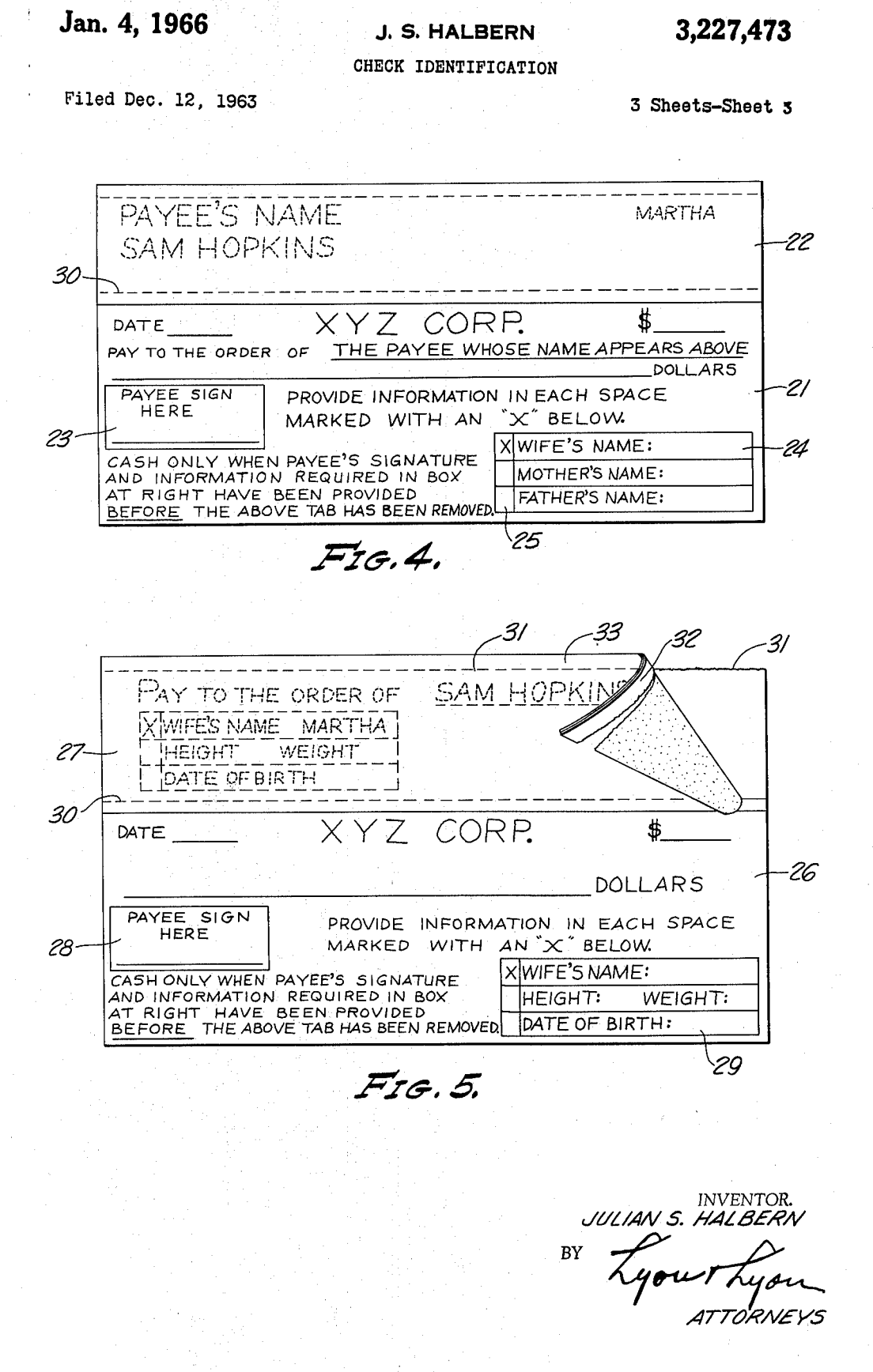

Jan. 4, 1966  J. S. HALBERN  3,227,473
CHECK IDENTIFICATION
Filed Dec. 12, 1963  3 Sheets-Sheet 3

INVENTOR.
JULIAN S. HALBERN
BY Lyon+Lyon
ATTORNEYS

_United States Patent Office_

3,227,473
Patented Jan. 4, 1966

3,227,473
CHECK IDENTIFICATION
Julian S. Halbern, 353 S. Oakhurst Drive,
Beverly Hills, Calif.
Filed Dec. 12, 1963, Ser. No. 330,070
4 Claims. (Cl. 282—23)

The present invention relates to improvements in check identification. More particularly, the present invention relates to means for assuring that the person presenting a check, negotiable instrument or similar instrument is, in fact, the person indicated as payee on the instrument. While the present invention is especially useful with regard to checks of the type often referred to as "Travelers Checks," it is to be understood that this invention is also applicable to other types of checks and negotiable instruments as well as other instruments with regard to which it is important that the holder or presenter of the instrument be capable of being identified with a high degree of certainty. For example, in addition to Travelers Checks, the check identification means of the present invention may usefully be applied to checks sent through the mails or issued to persons by the Federal or State Governments, industry, or the general public.

As is well known in the banking industry, there has been an increasing amount of check fraud in recent years. Although this crime has long been a problem, its modern proportions have become truly enormous. In fact, it has been estimated that more than several billion dollars per year is swindled by check fraud. It is also highly significant that the great majority of instances of this crime involve only relatively small amounts, i.e., $100.00, $50.00 or less. Thus, the victims of this crime are ordinarily individuals with relatively small bank accounts.

Furthermore, authoritative surveys have shown that, while most bank clerks and tellers are reasonably careful with regard to identifying the persons who present checks for payment, only a small number of merchants and the like who cash large numbers of checks for small amounts exercise even ordinary prudence in this regard.

A variety of attempts have been made to device means for protecting against check fraud, but, in general, these attempts have not been satisfactory because they were relatively easy to circumvent or because they were so elaborate that the public and financial institutions refused to accept them. One such method, as disclosed in Patent No. 1,307,560, has been to use a tab to cover a specimen of the payee's signature such that this specimen would be available for comparison at the time the check was presented for payment. It was supposed that this method might be particularly useful as applied to Travelers Checks since it was thought that the payee could first sign all of the Travelers Checks in the conventional manner and then secure the tabs such that these signatures would be concealed. It was believed that this would prevent fraud since the secured tab was such that it could not be removed without damage, thereby making it apparent whether the check had been tampered with or not. However, since Travelers Checks and other types of checks are often bound in book form, it was a comparatively simple matter to circumvent this device when a book of checks was stolen or lost and appropriated by another. When this occurred, the defrauder had only to remove the tab on one of the checks to gain access to the payee's signature. Then, with some practice, it was possible to reproduce the payee's signature on the remaining checks and have them cashed by unwary persons. A similar device is disclosed in Patent No. 1,621,865.

Thus, it has long been apparent to those skilled in the art that there has been a great need for check identification means which would identify each individual check in a foolproof manner, i.e., provide a separate identification symbol or symbols for each check rather than use the same symbol for a group of checks, and at the same time be sufficiently uncomplicated that it would be acceptable to Government, industry, commerce and the general public for use in connection with ordinary business. It is believed that the present invention substantially satisfies this need.

It is a primary object of the present invention to provide a means for effectively preventing the fraudulent cashing of checks which means permits each check to be provided with its own individual identifying symbol or symbols and which may be easily used without the aid of any special equipment.

It is another object of the present invention to provide a fraud prevention means which may be conveniently applied to instruments such as checks which comprises a tab secured to the check which tab is supplied with a transfer means such as carbon paper or the like, a page separate from the check which is adapted to cover the tab such that when this page is written upon, the writing will be transferred via the tab to the check and a flap adapted to be positioned under the check such that the writing made on the separate page is not transferred to any check other than that adjacent to the separate page.

It is a further object of the present invention to provide a fraud prevention means for checks and similar instruments according to which each instrument may be marked with an identifying symbol or symbols known only to the drawer and payee and which, unless disclosed by the drawer or payee, cannot be ascertained by another without visibly altering the appearance of the check. In the case of Travelers Checks, the drawer and payee will, of course, be the same person.

Other objects and advantages of the present invention, it is believed, will be apparent from the following description of specific embodiments thereof when read in connection with the drawings.

In the drawings:

FIGURE 3A is another plan view of the check illustrated in FIGURE 3.

FIGURE 4 is a plan view of another embodiment of the present invention which is particularly applicable to commercial checks.

FIGURE 4A is a plan view of the separate page which forms a part of the means illustrated in FIGURE 4.

FIGURE 5 is a plan view illustrating still another embodiment of my invention which is particularly applicable to commercial checks.

Figure 1:
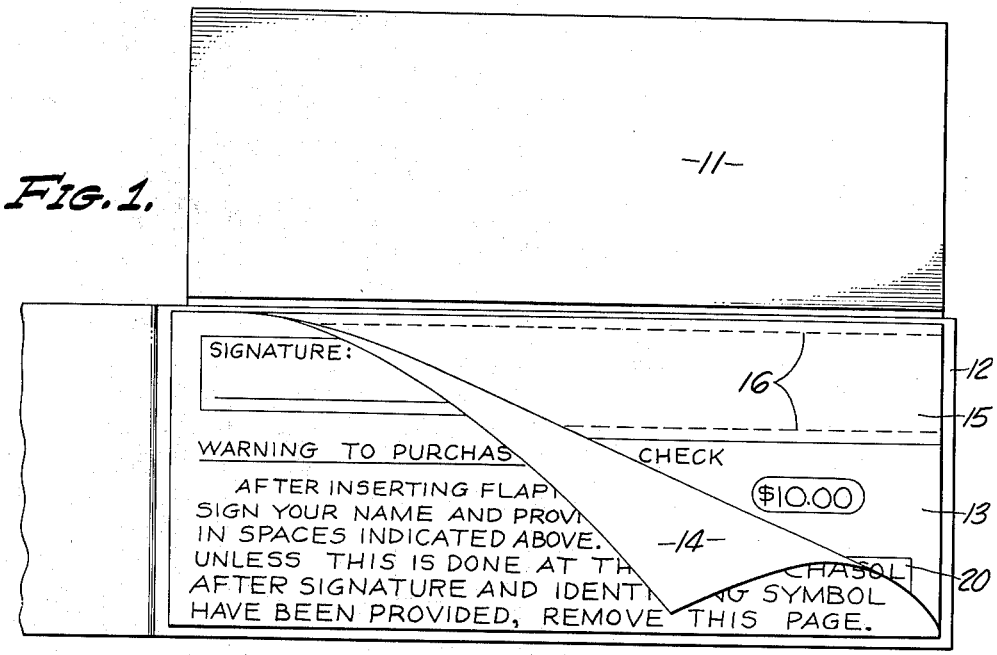
FIGURE 1 is a perspective view of the improved check identification means of the present invention as applied to a Travelers Check.

As shown in FIGURE 1, the present invention, as applied to a Travelers Check, comprises a flap 11 which is attached to cover 12 in such a manner that it may be swung downwardly to cover check 13 and page 14. Check 13 is provided with tab 15 which is securely attached thereto along the longitudinal edges of the tab. The tab is also provided with perforations 16 such that the body of the tab may be removed. The side of the tab 15 which is adjacent to check 13 is provided with a transfer medium such as carbon paper, NCR paper or the like.

Figure 2:
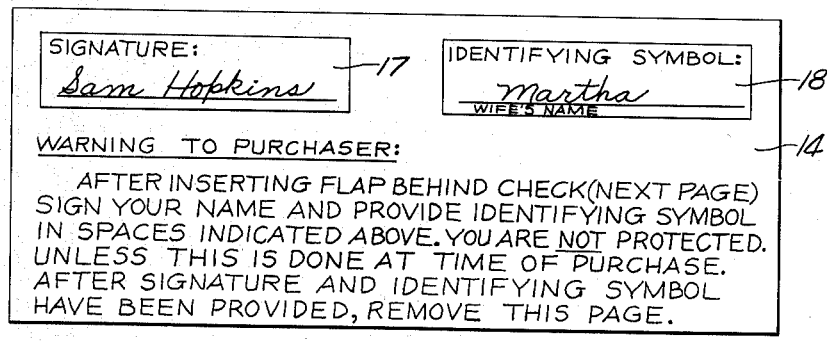
FIGURE 2 is a plan view of the separate page which forms a part of the means illustrated in FIGURE 1.

Page 14 is more completely illustrated in FIGURE 2 wherein the space 17 for writing the drawer's signature and space 18 for providing an identifying symbol or symbols are illustrated.

Figure 3:
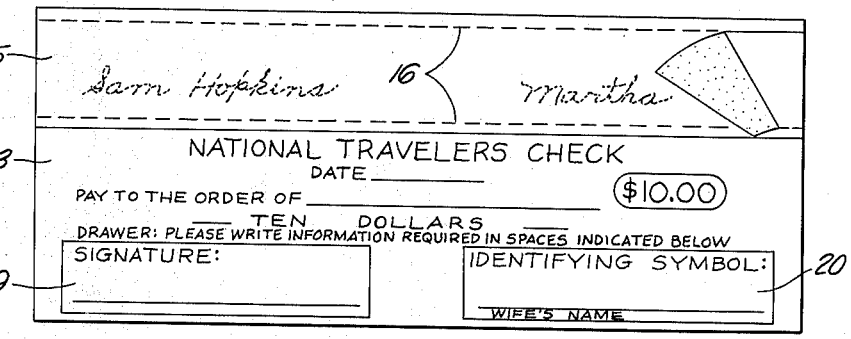
FIGURE 3 is a plan view of a check which has been provided with a concealed signature and identifying symbol according to the present invention.

Check 13 is more completely illustrated in FIGURE 3 wherein space 19 for signing the check at the time it is presented for payment and space 20 for supplying the identifying symbol or symbols are illustrated.

At the time the checks illustrated in FIGURES 1–3A are purchased, a package comprising several checks 13, each of which is provided with a tab 15 and each of which has a corresponding page 14 is obtained. This package also comprises cover 12 and flap 11. In the specific embodiment illustrated in these figures wherein the checks are Travelers Checks, the purchaser should, as soon as possible after purchase, perform the following steps with regard to each of the checks. Flap 11 should be inserted beneath the uppermost of checks 13 simply by lifting check 13 and corresponding page 14 such that hingedly mounted flap 11 may be swung down over the remaining checks. The check 13 and its corresponding page 14 are then placed on top of flap 11 and the purchaser signs page 14 in the place indicated by numeral 17. Since, as previously described, the underside of tab 15 is provided with a transfer medium such as carbon paper, this signature is reproduced on the corresponding portion of check 13. In like manner, an identifying symbol or symbols is written in the space indicated. As shown in FIGURE 2, this identifying symbol may be the name of another person, e.g., the purchaser's wife. This symbol is, of course, also transferred to the corresponding portion of check 13. While this is being done, flap 11 prevents the writing made on page 14 from being transferred to any of the checks other than that adjacent to page 14. This procedure is then repeated for each of the remaining checks with the exception that, preferably, a different identifying symbol or symbols is used for each check.

After this has been done, all of the pages 14 are removed. These pages may then be destroyed or kept in a safe place as a record. The checks may now be carried freely without fear of monetary loss if they are lost or stolen because, in order for proper endorsement, it will be necessary for the person presenting the check to sign the drawer's name at space 19 and supply the identifying symbol at space 20. The prospective payor may then remove tab 15 and compare the signature under the tab with that in space 19 and the identifying symbol or symbols under the tab with that in space 20. If the signatures and/or identifying symbols do not correspond, payment may then be refused.

Even if an entire book of checks is lost or stolen, there need be no fear of loss since only the drawer will know the nature of the identifying symbol on each check since each of these symbols should be different. Although a person other than the drawer may remove the tab on one of these checks to gain access to the drawer's signature, he will not be able to discover the nature of the identifying symbols on the remaining checks without removing the tabs from each of them. Of course, it will be readily apparent if the tab on a given check has been tampered with and, in this event, payment should be refused.

Although not necessary, it is preferred that space 20 on check 13 and space 18 on page 14 contain some indication of the nature of the identifying symbol such that it will not be necessary for the purchaser to memorize the identifying symbols or carry a list of the identifying symbols. For example, in the separate page shown in FIGURE 2 and in the check shown in the FIGURE 3, the nature of the identifying symbol is indicated by the words "wife's name." This indication of the identifying symbol could be printed on the check and separate page by the drawee or could be written in by the drawer.

With regard to FIGURE 3, it is to be understood that the signature and identifying symbol beneath tab 15 which are shown in broken lines in this figure would not be visible because the tab is such that it is not transparent. These broken lines have been included in the drawing only for the purpose of conveying as clear a description as possible of the present invention.

FIGURE 3A illustrates check 13 with tab 15 attached in the form that it might actually appear at the time the drawer was about to use it. As shown in this figure, tab 15 carries a series of instructions for the person cashing the check. Tab 15, of course, effectively conceals the information which appear on the check beneath the tab. The printed instructions on the visible surface of tab 15 function to further conceal the information on the check beneath the tab since the physical presence of these instructions renders the tab substantially more difficult to see through, even with equipment designed for this purpose.

In the embodiment of the present invention illustrated in FIGURE 4, a commercial check, rather than a Travelers Check, is used. As shown in FIGURE 4, check 21 is provided with tab 22 in the same manner as that shown in FIGURES 1–3A. Once again, the side of tab 22 which is adjacent to check 21 is provided with carbon paper or some other suitable transfer medium. This check may also be bound in a book similar to that illustrated in FIGURES 1–3A such that a separate page which corresponds to each check is provided and a flap which may be positioned beneath each check is provided. In this embodiment, the separate page is provided with a space for the payee's name and a space for indicating an identifying symbol. Check 21 is also provided with a space 23 for the signature of the payee and space 24 wherein the necessary identifying symbol or symbols may be written. Rather than indicating the name of the payee, the visible face of check 21 simply states that payment should be made to the payee whose name appears under the tab. Thus, until tab 22 has been removed, the payee's name will be concealed.

In addition to the payee's name, an identifying symbol or symbols are concealed by tab 22. As shown in FIGURE 4, space 24 is provided with a column 25 which may be appropriately marked as with the capital X shown in this figure to indicate which identifying symbol or symbols should be written in space 24.

For example, as shown in FIGURE 4, the payee's wife's name has been impressed on the check under tab 22 by the drawer. The drawer then also places a capital X in column 25 in the space adjacent to the line where "wife's name" is indicated as the identifying symbol. Thus, when the payee presents the check for payment, he must not only write this signature in space 23, but must also write the name "Martha" next to the words "wife's name" in space 24 before tab 22 has been removed.

Of course, more than one of the lines in space 24 may be marked with a capital X and space 24 may contain as many lines as are deemed necessary for adequate protection. This provision for multiple identifying symbols which may be used individually or in combination with each other is particularly valuable in those instances where checks are sent through the mails regularly from the same drawer to the same payee, e.g., pension checks. In these cases, if the same identifying symbol were used on each check, it would be possible for a potential forger to intercept a first check before it reached the payee and remove the tab to determine the identifying symbol. The forger could then await subsequent checks and fill in the identifying symbol and forge the payee's name. However, when as illustrated in FIGURE 4, provision is made for the use of a plurality of identifying symbols, the interception and removal of the tab from one check will be of no avail since subsequent checks will use different identifying symbols which will be indicated by one or more capital X's in column 25.

Tab 22 on check 21 may be provided with printed instructions similar to those shown on tab 15 in FIGURE 3A.

FIGURE 4A illustrates a separate page 34 which may be used in conjunction with check 21 illustrated in FIGURE 4. As shown in FIGURE 4A, separate page 34 is provided with space 35 in which the payee's name may be written and space 36 in which one or more identifying symbols may be written. Space 36 may be provided with a column 37 in which an X or other appropriate mark may be made to indicate which identifying symbols are to be written on a given page 34. Page 34 is also preferably provided with appropriate instructions for the use of this page.

FIGURE 5 illustrates another embodiment of the present invention. In this embodiment, check 26 is provided with tab 27. This check differs from that shown in FIGURE 4 in that the entire statement "Pay to the order of" is concealed by tab 27 as well as the payee's name and the identifying symbol or symbols. Once again, the payee must first write his name and the idenifying symbol in spaces 28 and 29 respectively, before removing tab 27 in order to obtain payment of the check. As illustrated in FIGURE 5, this check may also be provided with means for using more than one identifying symbol.

As previously indicated with regard to FIGURE 3, the information appearing beneath tabs 22 and 27 in FIGURES 4 and 5 which is shown by broken lines is not visible until the tab is removed.

It will be readily apparent to those skilled in the art that the specific embodiments of the present invention which have been described herein may be modified in many ways without departing from the scope of this invention. For example, the checks need not be Travelers Checks, but may be any type of check, e.g., those illustrated in FIGURES 4 and 5, negotiable instrument or similar instrument. Furthermore, the checks may be arranged such that there are several checks on each page rather than just the single check shown in the drawings. However, whatever the arrangement of the checks, there should be a corresponding page 14 for each check and a flap 11 when these checks are bound in book form.

Furthermore, it is to be understood that flap 11 may be movably mounted such that it may be positioned under the checks from the bottom or side of cover 12 in addition to the manner illustrated in FIGURE 1 or may be mounted in any other suitable manner. Similarly, the perforations which facilitate the removal of tabs 15, 22 and 27 may be transverse to the length of the tab or may be arranged in any other suitable manner. With regard to these perforations, it has been found that removal of the tab is facilitated when, as illustrated, in FIGURE 5, the lower row of perforations 30 are perforations in the tab only while the upper row of perforations 31 are perforations in the tab and check. When the perforations are so made, the upper portion 32 of check 26 will be removed along with upper portion tab 33 of tab 27 and then the body of tab 27 may be removed.

In addition to being foolproof, it is extremely important that the fraud prevention means of the present invention is not at all cumbersome and is very easy to use. It is believed that the biggest single obstacle which was encountered by the previous attempts to solve the check fraud problem was that those attempts which were reasonably satisfactory from an identification standpoint were so cumbersome and/or complicated that the general public or anyone writing a check simply would not make use of them. However, the present invention, through the unique combination of a check or similar instrument having a tab bearing a transfer medium secured thereto, a separate page corresponding to the check upon which a signature and identifying symbol or symbols may be written in such a manner that they will be transferred via the tab to the body of the check, the use of different identifying symbols on each check and the flap which is adapted to be positioned beneath each check while the signature or payee's name and identifying symbol are written on the separate page corresponding to the check so that the signature or payee's name and identifying symbols will not be transferred to any check other than that adjacent to the separate page, obviates the problems associated with the prior art work in this field.

There is, of course, virtually no limit to the different identifying symbols which may be used on the checks. For example, such information as height, weight, color of eyes, birthdate, father's name, mother's name, spouse's name, Social Security number, phone number, names of superior officers, name of dog, automobile license number, etc., may be used.

Having fully described the present invention, it is to be understood that it is not to be limited to the details set forth, but is of the full scope of the appended claims.

I claim:

1. An article comprising a check, said check having as an integral part thereof a stub which is connected to said check; a tab overlying, removably attached to and substantially coextensive with said stub, said tab being sealed to said stub such that the surface of said stub is invisible without breaking the seal between said tab and said stub, that side of said tab which is adjacent to said stub being provided with an area of transfer material; and a separate page which is at least coextensive with said tab and removably attached to said check such that it may be positioned in overlying relation with said tab whereby subject matter written on said separate page may be reproduced on the invisible surface of said stub without being visible on the surface of said tab and whereby said separate page may be removed to produce a forge preventative check.

2. The article of claim 1 wherein a plurality of said checks, each being provided with a stub, are arranged on a single page and wherein each of said checks is provided with a corresponding separate page.

3. The article of claim 1 wherein a plurality of said checks and separate pages are associated with each other in book form, said article being provided with a flap, said flap being movably mounted such that it is adapted to be positioned beneath each of said checks and to be removed from beneath of each of said checks, said flap being such that it is capable of, when positioned beneath a given one of said checks, preventing a writing made on the separate page corresponding to said check from being transferred to any stub other than the stub on said given check.

4. The article of claim 1 wherein said transfer material is carbon paper.

References Cited by the Examiner

UNITED STATES PATENTS

| | | | |
|---|---|---|---|
| 1,218,700 | 3/1917 | Rotenberg | 282—23 |
| 1,285,184 | 11/1918 | Hollister | 282—23 |
| 1,368,518 | 2/1921 | Mayne | 282—22 |
| 1,646,033 | 10/1957 | May | 283—58 |
| 2,374,723 | 5/1945 | Barghausen | 282—22 |
| 3,048,426 | 8/1962 | Rodrigues et al. | 283—58 X |

EUGENE R. CAPOZIO, *Primary Examiner.*

LAWRENCE CHARLES, JEROME SCHNALL,
*Examiners.*